(12) United States Patent
Navid (10) Patent No.: US 10,135,566 B2
(45) Date of Patent: Nov. 20, 2018

(54) BASELINE WANDER CORRECTION

(71) Applicant: Rambus Inc., Sunnyvale, CA (US)

(72) Inventor: Reza Navid, San Francisco, CA (US)

(73) Assignee: Rambus Inc., Sunnyvale, CA (US)

(*) Notice: Subject to any disclaimer, the term of this patent is extended or adjusted under 35 U.S.C. 154(b) by 0 days.

(21) Appl. No.: 15/264,283

(22) Filed: Sep. 13, 2016

(65) Prior Publication Data

US 2017/0093525 A1  Mar. 30, 2017

Related U.S. Application Data

(60) Provisional application No. 62/233,688, filed on Sep. 28, 2015.

(51) Int. Cl.
*H04L 1/00* (2006.01)
*H04L 25/02* (2006.01)

(52) U.S. Cl.
CPC ........ *H04L 1/0036* (2013.01); *H04L 25/0272* (2013.01)

(58) Field of Classification Search
CPC .................................................. H04L 1/0036
USPC ......................................................... 375/340
See application file for complete search history.

(56) References Cited

U.S. PATENT DOCUMENTS

| | | | |
|---|---|---|---|
| 6,697,611 B1* | 2/2004 | Franca-Neto | H03F 3/45982 375/319 |
| 8,461,896 B2 | 6/2013 | Zhuang | |
| 8,599,966 B2 | 12/2013 | Beukema et al. | |
| 8,867,668 B2 | 10/2014 | Beukema et al. | |
| 2006/0273851 A1* | 12/2006 | Stein | H03F 3/68 330/69 |
| 2016/0173299 A1* | 6/2016 | Islam | H04L 25/03057 375/233 |

OTHER PUBLICATIONS

Gangasani, Gautam R. et al., "A 32 Gb/s Backplane Transceiver With On-Chip AC-Coupling and Low Latency CRD in 32nm SOI CMOS Technology", IEEE Journal of Solid-State Circuits, vol. 49, No. 11, pp. 2474-2489, Nov. 2014. 17 pages.

* cited by examiner

*Primary Examiner* — Michael Neff
(74) *Attorney, Agent, or Firm* — The Neudeck Law Firm, LLC (57) ABSTRACT

A receiver frontend having a high-frequency AC-coupled path in parallel to a low-frequency feed-forward path for baseline correction. The low-frequency path blocks the DC common-mode voltage of the input differential signal pair, but passes low-frequency differential signal components (e.g., long strings of a single value, or disparities in the number of 1's and 0's over a long period of time.) The low-frequency path can include a passive network for level shifting and extending the range of acceptable common-mode input voltages. The low-frequency path can also include a differential (e.g., transconductance) amplifier to isolate the common-mode input voltage from the output of the baseline wander correction circuit.

15 Claims, 7 Drawing Sheets

BASELINE WANDER CORRECTION

DETAILED DESCRIPTION OF THE EMBODIMENTS

In an AC-coupled differential signaling communication system, the baseline (i.e., low-frequency component of a differential signal pair) may experience data dependent changes (or 'wander'). In particular, long strings of a single value (e.g., several thousand consecutive 1's or 0's) or disparities in the number of 1's and 0's over a long period of time can cause the AC coupling capacitors to charge to different DC voltages on the two lines of the differential signal. This disparity in DC voltages causes the baseline voltage at the output of the AC coupling capacitors to be shifted. This shift in baseline voltage can move the voltage levels of the AC coupled signals such that decision threshold voltages will fall outside of the edges of the data eye. This has adverse consequences for bit error rates.

In an embodiment, a low-frequency feed-forward path is provided in parallel to the high-frequency AC-coupled path. This low-frequency path blocks the DC common-mode voltage of the input differential signal pair (much like the AC coupling capacitors), but passes low-frequency differential signal components (e.g., long strings of a single value, or disparities in the number of 1's and 0's over a long period of time.)

Figure 1:
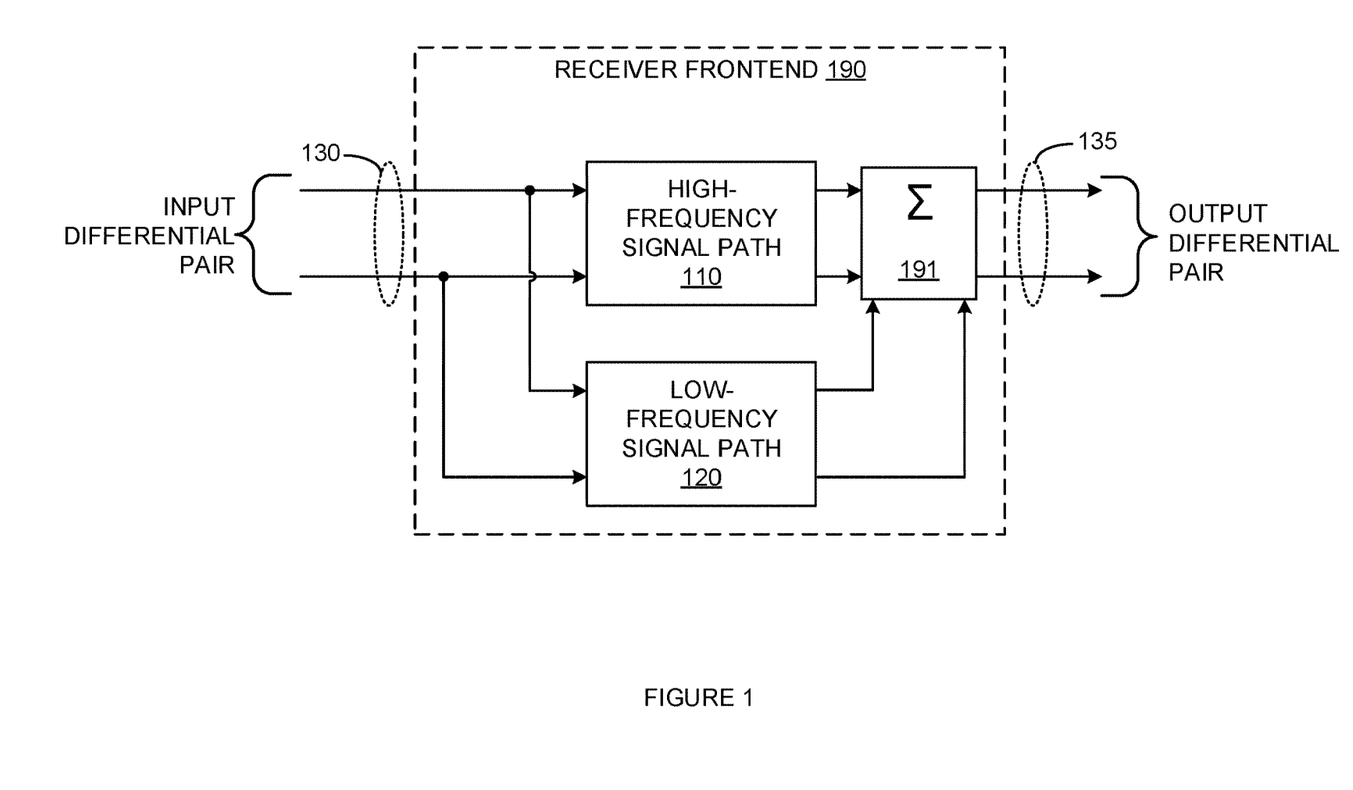
FIG. 1 is a system block diagram illustrating a receiver frontend with baseline wander correction.

FIG. 1 is a system block diagram illustrating a receiver frontend with baseline wander correction. In FIG. 1, receiver frontend 190 comprises high-frequency signal path 110, low frequency-signal path 120, and signal summation 191. Both high-frequency signal path 110 and low frequency-signal path 120 receive input differential signal pair 130. The respective outputs of high-frequency signal path 110 and low frequency-signal path 120 are added together by signal summation 191 to provide output differential signal pair 135. Thus, it should be understood that the high-frequency differential signal components on input differential signal pair 130 are passed to the output differential signal pair 135 by high-frequency signal path 110. The low-frequency differential signal components on input differential signal pair 130 are passed to the output differential signal pair 135 by low-frequency signal path 120.

In an embodiment, high-frequency signal path 110 includes DC blocking capacitors in series with the signal lines of input differential signal pair 130. Thus, the output of high-frequency signal path 110 is an AC-coupled version of the signal on input differential signal pair 130. The output of high-frequency signal path 110 is applied to an input of summation 191 to be added with the output of low-frequency signal path 120 and thereby be passed to the output differential signal pair 135.

Low-frequency signal path 120 electrically isolates the common-mode voltage of input differential signal pair 130 from the output differential signal pair 135. In other words, low-frequency signal path 120 does not pass the common mode-voltage on input differential signal pair 130 to output differential signal pair 135.

Low-frequency signal path 120 passes low-frequency (e.g., below a selected cutoff frequency) differential signals from the input differential signal pair 130 to the output of low-frequency signal path 120. The output of low-frequency signal path 120 is applied to an input of summation 191 to be added with the output of high-frequency signal path 110 and thereby be passed to the output differential signal pair 135. The output of summation 191 is differential signal pair 135. Bit sequences that are well balanced between 1's and 0's are mainly passed by high-frequency signal path 110, while long unbalanced sequences are mainly passed by low-frequency signal path 120.

Figure 2:
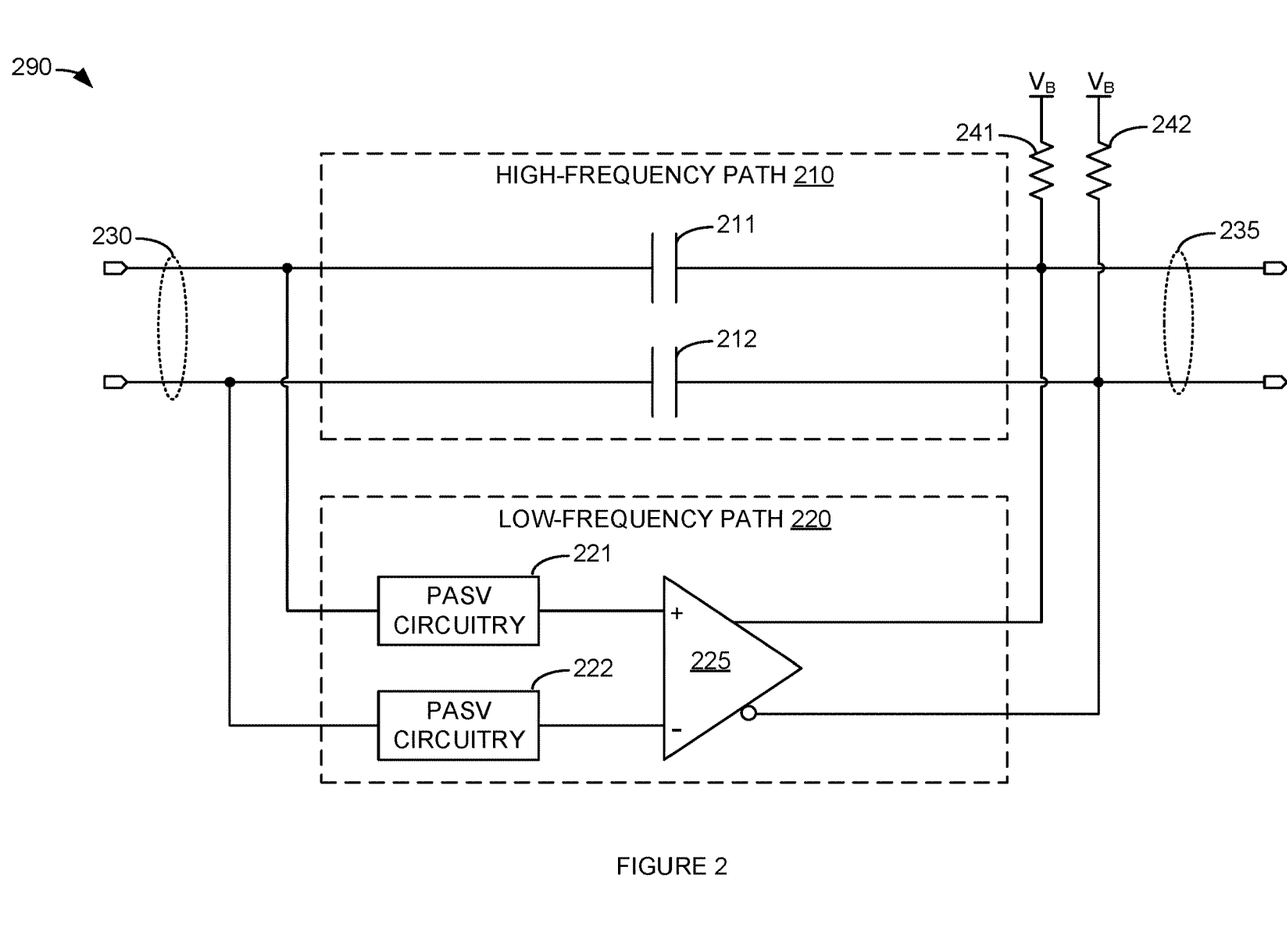
FIG. 2 is a circuit block diagram illustrating a receiver frontend with baseline wander correction.

FIG. 2 is a circuit block diagram illustrating a receiver frontend with baseline wander correction. In FIG. 2, receiver frontend 290 comprises high-frequency path 210, low-frequency path 220, resistor 241, and resistor 242. Input differential signal pair 230 is connected to the inputs of both high-frequency path 210 and low-frequency path 220. The respective outputs of high-frequency path 210 and low-frequency path 220 are connected to output differential signal pair 235 creating a pair of current summation nodes. Resistors 241 and 242 convert the differential currents at the current summation nodes to a differential voltage. A first terminal of resistor 241 is connected to a first signal line of output differential signal pair 235. The second terminal of resistor 241 receives bias voltage, $V_B$. A first terminal of resistor 242 is connected to a second signal line of output differential signal pair 235. The second terminal of resistor 242 receives bias voltage, $V_B$.

High-frequency path 210 includes DC blocking capacitor 211 and DC blocking capacitor 212. DC blocking capacitor 211 is connected in series between a first signal line of input differential signal pair 230 and the first signal line of output differential signal pair 235. DC blocking capacitor 212 is connected in series between the second signal line of input differential signal pair 230 and the second signal line of output differential signal pair 235. Thus, it should be understood that high-frequency signal path 210 comprises an AC-coupling network between input differential signal pair 230 and output differential signal pair 235.

Low-frequency path 220 includes passive circuitry 221, passive circuitry 222, and differential transconductance amplifier 225. Passive circuitry 221 is coupled to receive the first signal line of input differential signal pair 230. Passive circuitry 222 is coupled to receive the second signal line of input differential signal pair 230. The output of passive circuitry 221 is coupled to the non-inverting input of differential transconductance amplifier 225. The output of passive circuitry 222 is coupled to the inverting input of differential transconductance amplifier 225. The non-inverting output of differential transconductance amplifier 225 is connected to the first signal line of output differential signal pair 235. The inverting output of differential transconductance amplifier 225 is connected to the second signal line of output differential signal pair 235.

Passive circuitry 221 and passive circuitry 222 can level-shift the signal on differential signal pair 230 to a desired level. Passive circuitry 221 and passive circuitry 222 may comprise, for example, a resistive voltage divider network. It should also be understood that passive circuitry 221 and passive circuitry 222 may be optionally omitted. Thus, in an embodiment, passive circuitry 221 and passive circuitry 222 are direct connections (e.g., wires) and differential signal pair 230 is connected directly to the input of differential transconductance amplifier 225.

Passive circuitry 221 and passive circuitry 222 can attenuate the signals (both common-mode and differential) on input differential signal pair 230. Passive circuitry 221 and passive circuitry 222 can shift the common-mode signal level towards what is suitable for the transconductance amplifier 225. Passive circuitry 221 and passive circuitry 222 are typically identical. Passive circuitry 221 and passive circuitry 222 attenuate the signal on input differential signal pair 230 by a factor of, for example, K. Attenuating (or dividing) the common-mode voltage on input differential signal pair 230 by the factor, K, increases the range of common-mode voltages that can be applied at the input of low-frequency path 220 by a factor of K.

In other words, if differential transconductance amplifier 225 requires a specified common-mode input voltage range to perform adequately, attenuating the common-mode voltage by K allows a larger common-mode input voltage range to be applied by input differential signal pair 230 than can be applied directly to differential transconductance amplifier 225. For example, consider a case where the attenuation is K=3.0 and the common-mode input voltage operating range of differential amplifier is 0.5 volt (i.e., from 1.1V to 1.6V.) In this case, the common-mode input voltage range that can be applied by input differential signal pair 230 to low-frequency path 220 could be 1.1×3.0=3.3V to 1.6× 3.0=4.8V—thus widening the acceptable range of common-mode input voltages from a 0.5V wide range to a 1.5V wide range. Using available power supply rails (e.g., $V_{DD}$, GND, $V_B$, etc.), passive circuitry 221 and passive circuitry 222 can also shift this range up or down. For example, the acceptable range at the input differential signal pair 230 to low-frequency path 220 can be made from 0 to 1.5V or from 5V to 6.5V.

Differential transconductance amplifier 225, along with resistors 241 and 242, provide a gain to offset (or at least help offset) the attenuation by passive networks 221-222. Thus, in an embodiment, the differential gain of differential transconductance amplifier 225 is selected to be equal to (or approximately equal to) the attenuation factor, K. Thus, in an embodiment, the net gain for low-frequency differential signals through low-frequency path 210 is approximately, or equal to, unity (1.0).

In an embodiment, the relative gain/attenuation selected through low-frequency path 220 versus the gain/attenuation provided through high-frequency path 210 may be selected to provide channel equalization. In other words, the gain/attenuation of low-frequency path 220 may be selected to be different from that of the high-frequency path 210. For example, the attenuation of high-frequency path 210 may be set to be lower than the attenuation of low-frequency path 220. This emphasizes the high-frequency components on differential signal pair 230.

In an embodiment, differential transconductance amplifier 225 is designed such that the common-mode gain of differential transconductance amplifier 225 is as small as possible (e.g., 0). Making the common-mode gain of differential transconductance amplifier 225 as small as possible (or zero) isolates the common-mode voltage of input differential signal pair 230 from output differential signal pair 235.

In an embodiment, the bandwidth required for differential transconductance amplifier 225 is over a relatively small range of low-frequencies. The transition frequency for signals between low-frequency path 220 and high-frequency path 210 can be determined by DC blocking capacitors 211-212 and resistors 241-242. This arrangement has self-regulating properties. In other words, at higher frequencies (as determined by the values of DC blocking capacitors 211-212 and the values of resistors 241-242) DC blocking capacitors 211-212 appear as a short-circuit to the high-frequency AC signal components. This effectively shorts the output of low-frequency path 220 to an AC ground—thereby neutralizing low-frequency path 220. At lower frequencies (as determined by the values of DC blocking capacitors 211-212 and the values of resistors 241-242), DC blocking capacitors 211-212 appear as an open circuit to the low-frequency AC signal components—thereby leaving low-frequency path 220 as the primary path for signals to be propagated from input differential signal pair 230 to output differential signal pair 235.

Passive networks 221-222 can be programmable to accommodate any common-mode input voltage on input differential signal pair 230 as long as it is known (either during the design phase, or in operation.) Thus, in an embodiment, a common-mode voltage sensing circuit can be coupled to input differential signal pair 230 to automatically program passive circuitry 221-222 for acceptable operation of differential transconductance amplifier 225. Resistors and/or the input impedance of passive circuitry 221-222 can be significantly larger than 50-ohm terminations.

Figure 3:
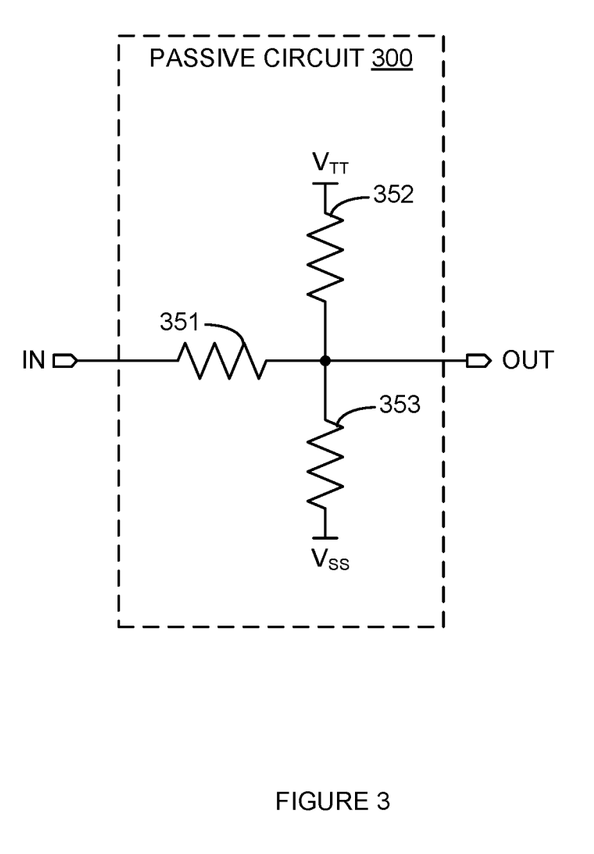
FIG. 3 is a schematic diagram of a passive level shifting and attenuating circuit.

FIG. 3 is a schematic diagram of a passive level shifting and attenuating circuit. Passive circuit 300 is an example of passive circuitry 221 and/or passive circuitry 222. In FIG. 3, passive circuit 300 includes resistor 351, resistor 352, and resistor 353. The input node of passive circuit 300 (e.g., one of the signal lines of differential signal pair 230) is connected to a first terminal of resistor 351. The second terminal of resistor 351 is connected to the output node of passive circuit 300. A first terminal of resistor 352 is connected to a positive supply voltage, $V_{TT}$. The second terminal of resistor 352 is connected to the output node of passive circuit 300. A first terminal of resistor 353 is connected to a negative supply voltage, $V_{SS}$. The second terminal of resistor 353 is connected to the output node of passive circuit 300.

It should be understood that passive circuit 300 forms a resistive voltage divider and a voltage level shifter. By selecting appropriate values for resistors 351-353, the attenuation provided by passive circuit 300 can be controlled to be a desired value (e.g., K), and, at the same time, signal level can be shifted to a desired level. Typically, resistors 351-353 will be selected to be significantly larger (e.g., 10×) than a typical termination impedance of 50 ohms.

Figure 4:
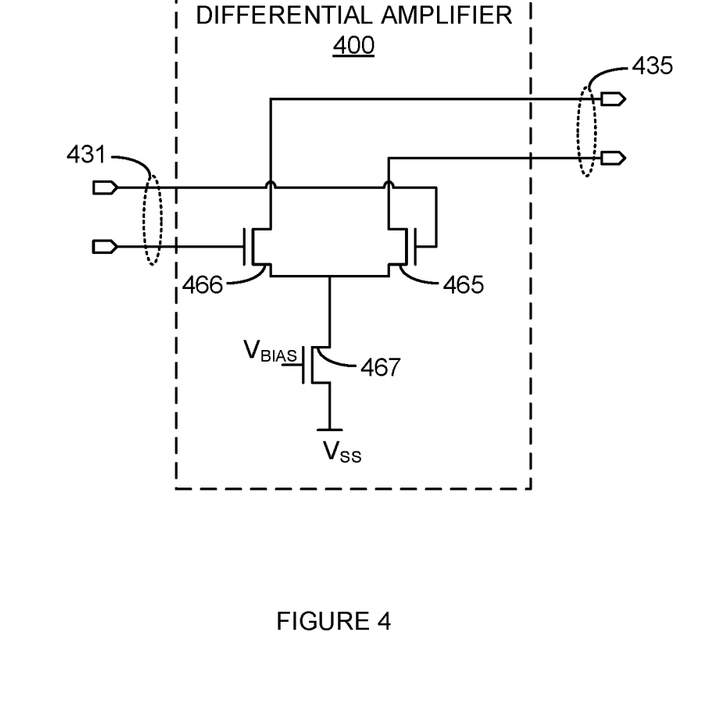
FIG. 4 is a schematic of a differential amplifier circuit.

FIG. 4 is a schematic of a differential transconductance amplifier circuit. Differential transconductance amplifier 400 is an example of differential transconductance amplifier 225. In FIG. 4, differential transconductance amplifier 400 includes n-channel field-effect transistor (NFET) 465, NFET 466, and NFET 467. The gate of NFET 465 is connected to a first signal line of an input differential signal pair 431. The gate of NFET 466 is connected the second signal line of the input differential signal pair 431. The drain of NFET 466 is connected to a first signal line of an output differential signal pair 435. The drain of NFET 465 is connected to the second signal line of the output differential signal pair 435. The sources of NFET 465 and NFET 466 are both connected to the drain of NFET 467. The gate of NFET 467 receives a bias voltage, $V_{BIAS}$. The source of NFET 476 is connected to a negative supply voltage $V_{SS}$.

As discussed herein, differential transconductance amplifier 400 is shown as a common-source differential amplifier. When used as differential transconductance amplifier 225 in low-frequency path 220, resistors 241-242 act as load resistors to bias the drains of NFETs 465-466. Resistors 241-242 also set the voltage gain of the low-frequency path.

Differential transconductance amplifier 400 can be designed such that the common-mode gain of differential transconductance amplifier 400 is as small as possible (e.g., 0). Making the common-mode gain of differential transconductance amplifier 400 as small as possible (or zero) helps isolate the common-mode voltage of input differential signal pair 431 from output differential signal pair 435. Differential transconductance amplifier 400 can also be designed and/or biased such that the open-loop differential gain of differential transconductance amplifier 400 is approximately equal to (or equal to) the attenuation factor, K. The values of resistors 241-242, the current flowing through NFET 267 (as set by $V_{BIAS}$), and the geometry (i.e., width-to-length ratio) of NFETs 465-466 are, according to known equations, the major contributors to open-loop differential gain of differential transconductance amplifier 400. In an embodiment a constant-gm bias circuit can be used to bias differential transconductance amplifier 400. The constant-gm bias circuit adjusts the current flowing through NFET 267 to keep the gain of the transconductance amplifier 400 constant in the presence of supply, process and temperature variations.

Figure 5A:
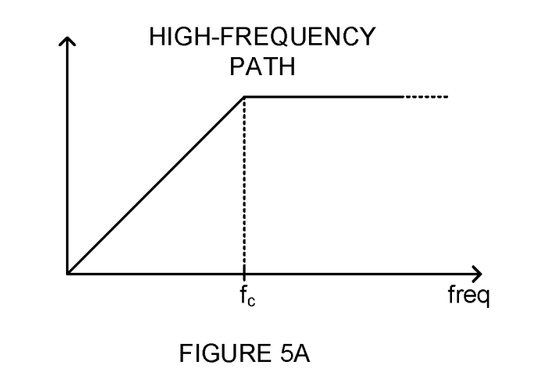
FIG. 5A illustrates the frequency response of a high-frequency path.
Figure 5B:
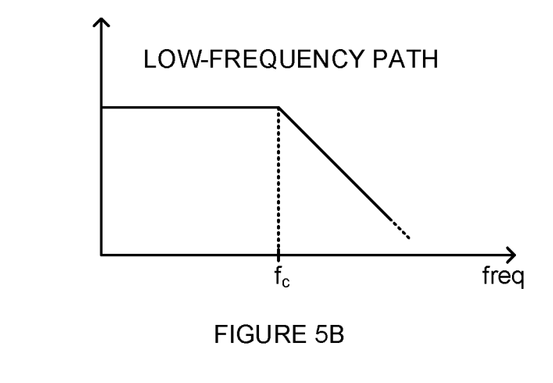
FIG. 5B illustrates the frequency response of a low-frequency path.
Figure 5C:
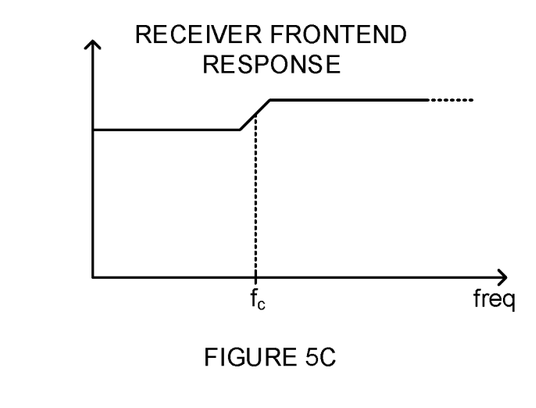
FIG. 5C illustrates the frequency response of a receiver frontend with baseline wander correction.

FIGS. 5A-5C illustrates the frequency response of the path elements, and combined response of a baseline wander correction system. FIG. 5A illustrates the frequency response of a high-frequency path—for example high-frequency path 110 and/or high-frequency path 210. The cutoff frequency, $f_c$, illustrated in FIG. 5A is determined by the values of, for example, DC blocking capacitors 211-212 (a.k.a., AC coupling capacitors) and resistors 241-242. FIG. 5B illustrates the frequency response of a low-frequency path—for example low-frequency path 120 and/or low-frequency path 220. The cutoff frequency, $f_c$, illustrated in FIG. 5B is also determined by the values of DC blocking capacitors 211-212 and resistors 241-242. Thus, since the cutoff frequency fc for both the low-frequency path illustrated in FIG. 5A and the high-frequency path illustrated in FIG. 5B are determined by the same circuit elements (namely, capacitors 211-212 and resistors 241-242), the transition frequency between signals being primarily carried by the low-frequency path versus the high-frequency path is matched among the low-frequency path and the high-frequency path.

FIG. 5C illustrates the frequency response of a baseline wander correction system. FIG. 5C illustrates the frequency response of the parallel combination of a high-frequency path (e.g., high-frequency path 110 and/or high-frequency path 210) and a low-frequency path (e.g., low-frequency path 120 and/or low-frequency path 220.)

In an embodiment, the relative gain/attenuation of the passband of low-frequency path 220 versus the gain/attenuation of the passband of high-frequency path may be selected to provide channel equalization. In other words, the gain/attenuation of the passband of the low-frequency path illustrated in FIG. 5B may be selected to be different from that of passband of the high-frequency path illustrated in FIG. 5A. The relative gain/attenuation through the low-frequency and high-frequency paths can be used to emphasize certain frequency components on the input differential signal pair.

Figure 6:
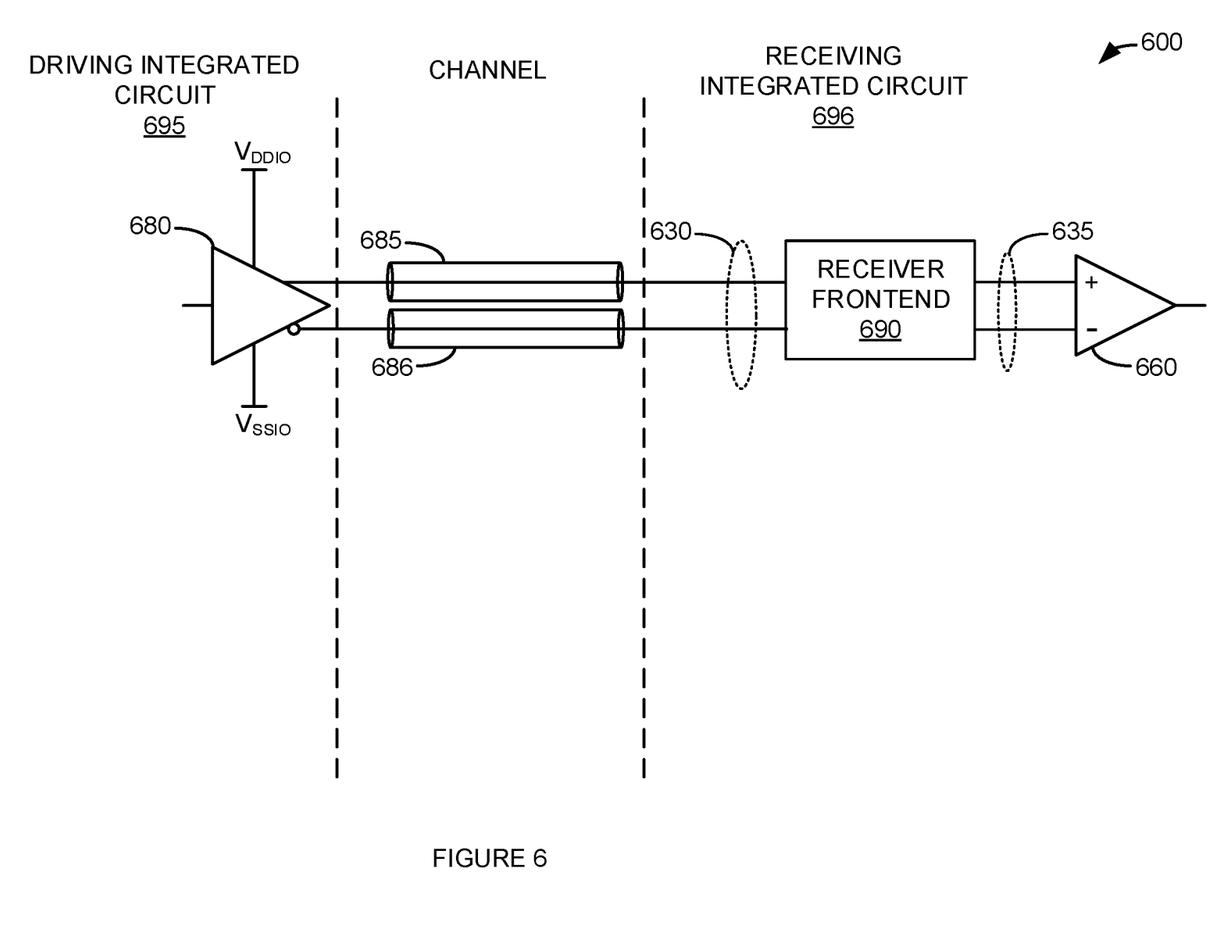
FIG. 6 illustrates a differential signaling communication system.

FIG. 6 illustrates a differential signaling communication system. In FIG. 6, communication system 600 comprises driving integrated circuit 695, receiving integrated circuit 696, transmitter circuit 680, transmission line 685, transmission line 686, receiver frontend 690, and high-frequency active receiver circuit (or stage) 660. As illustrated in FIG. 6, transmitter circuit 680 would typically be included on an integrated circuit 695 that is driving differential signals. Transmission lines 685-686 would typically be outside of an integrated circuit as part of a printed circuit (PC) board or other substrate. Receiver frontend 690 and receiver circuit 660 would typically be part of an integrated circuit 696 that is receiving differential signals.

Driving integrated circuit 695 and receiving integrated circuit 696 may comprise circuitry on integrated circuit type devices, such as one commonly referred to as a "chip". Driving integrated circuit 695 and receiving integrated circuit 696 may be blocks of circuitry on the same integrated circuit. Driving integrated circuit 695 and receiving integrated circuit 696 may be parts or blocks of separate integrated circuit devices.

For example, driving integrated circuit 695 and receiving integrated circuit 696 may be part of a memory controller and/or a memory device. A memory controller manages the flow of data going to and from memory devices (e.g., driving integrated circuit 695 or receiving integrated circuit 696.) For example, a memory controller may be a northbridge chip, an application specific integrated circuit (ASIC) device, a graphics processor unit (GPU), a system-on-chip (SoC) or an integrated circuit device that includes many circuit blocks such as ones selected from graphics cores, processor cores, and MPEG encoder/decoders, etc. A memory device devices (e.g., driving integrated circuit 695 or receiving integrated circuit 696) can include a dynamic random access memory (DRAM) core or other type of memory cores, for example, static random access memory (SRAM) cores, or non-volatile memory cores such as flash. In addition, although some embodiments presented herein describe memory controller and components, the instant baseline wander correction circuits, apparatus, and methods may also apply to chip interfaces that effectuate signaling between other types of integrated circuit devices.

In FIG. 6, the positive supply terminal of transmitter circuit 680 is connected to positive power supply $V_{DDIO}$. The negative power supply terminal of transmitter circuit 680 is connected to negative power supply $V_{SSIO}$. The non-inverting output of transmitter circuit 680 is connected to a first end of transmission line 685. The inverting output of transmitter circuit 680 is connected to a first end of transmission line 686. The second end of transmission line 685 is connected to a first differential signal line input to receiver frontend 690. The second end of transmission line 686 is connected to a second differential signal line input to receiver frontend 690. Thus, receiver frontend 690 receives a differential signal pair 630 from transmitter circuit 680 via transmission lines 685-686.

Receiver frontend 690 can have the same structure and/or function, or be, receiver frontend 190 and/or receiver frontend 290, as described herein. The output of receiver frontend 690 is differential signal pair 635. Differential signal pair 635 is coupled to high-frequency active receiver circuit 660. High-frequency active receiver circuit 660 can resolve the differential signals present on the differential signal pair 635 (as output by receiver frontend 690) to sample the digital values being transmitted by transmitter circuit 680.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of receiver frontend 190, receiver frontend 290, passive circuit 300, differential transconductance amplifier 400, and/communication system 600, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 7:
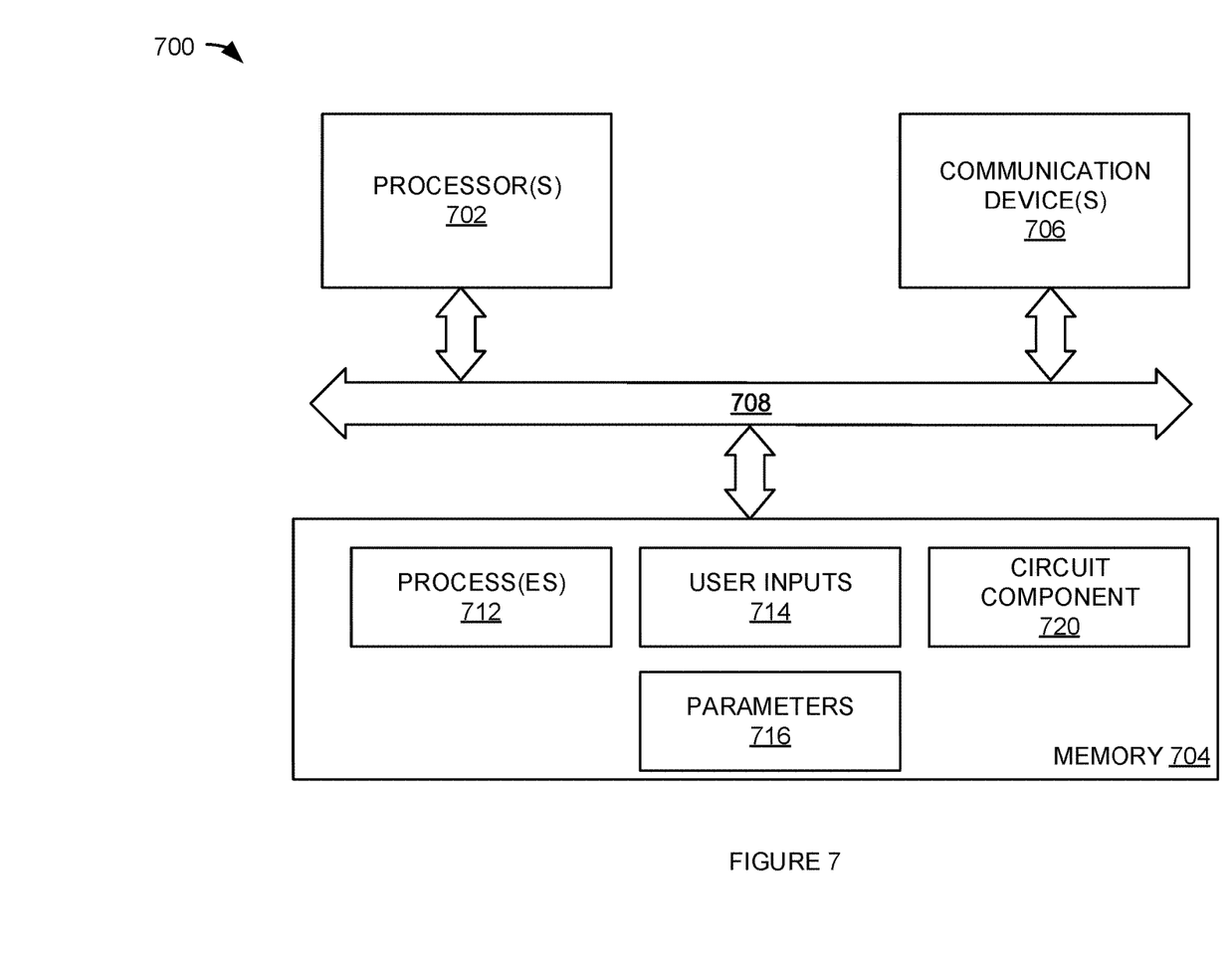
FIG. 7 is a block diagram illustrating a processing system.

FIG. 7 is a block diagram illustrating one embodiment of a processing system 700 for including, processing, or generating, a representation of a circuit component 720. Processing system 700 includes one or more processors 702, a memory 704, and one or more communications devices 706. Processors 702, memory 704, and communications devices 706 communicate using any suitable type, number, and/or configuration of wired and/or wireless connections 708.

Processors 702 execute instructions of one or more processes 712 stored in a memory 704 to process and/or generate circuit component 720 responsive to user inputs 714 and parameters 716. Processes 712 may be any suitable electronic design automation (EDA) tool or portion thereof used to design, simulate, analyze, and/or verify electronic circuitry and/or generate photomasks for electronic circuitry. Representation 720 includes data that describes all or portions of receiver frontend 190, receiver frontend 290, passive circuit 300, differential transconductance amplifier 400, and/communication system 600, and their components, as shown in the Figures.

Representation 720 may include one or more of behavioral, register transfer, logic component, transistor, and layout geometry-level descriptions. Moreover, representation 720 may be stored on storage media or communicated by carrier waves.

Data formats in which representation 720 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 714 may comprise input parameters from a keyboard, mouse, voice recognition interface, microphone and speakers, graphical display, touch screen, or other type of user interface device. This user interface may be distributed among multiple interface devices. Parameters 716 may include specifications and/or characteristics that are input to help define representation 720. For example, parameters 716 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 704 includes any suitable type, number, and/or configuration of non-transitory computer-readable storage media that stores processes 712, user inputs 714, parameters 716, and circuit component 720.

Communications devices 706 include any suitable type, number, and/or configuration of wired and/or wireless devices that transmit information from processing system 700 to another processing or storage system (not shown) and/or receive information from another processing or storage system (not shown). For example, communications devices 706 may transmit circuit component 720 to another system. Communications devices 706 may receive processes 712, user inputs 714, parameters 716, and/or circuit component 720 and cause processes 712, user inputs 714, parameters 716, and/or circuit component 720 to be stored in memory 704.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A receiver frontend for a differential signal pair, comprising:
   a passive high frequency signal path comprising DC blocking capacitors that couple an input differential signal pair to an active receiver stage; and,
   a low frequency signal path, that includes a differential amplifier, to couple the input differential signal pair to the active receiver stage, the output of the low frequency signal path to electrically isolate a common-mode voltage of the input differential signal pair from the active stage and to present a restored baseline voltage to the active stage, the low frequency signal path including a passive network to level-shift the common-mode voltage of the input differential signal pair.

2. The receiver frontend circuit of claim 1, wherein the low frequency signal path electrically isolates the common-mode voltage of the input differential signal pair from the active stage using a transconductance amplifier as the differential amplifier.

3. The receiver frontend of claim 1, wherein input differential signal pair includes a first input signal node and a second input signal node, the passive network comprising a first resistive divider connected to the first input signal node and a second resistive divider connected to the second input signal node.

4. The receiver frontend of claim 3, wherein a first resistive divider and the second resistive divider are programmable to receive a plurality of common-mode voltages of the input differential signal pair.

5. The receiver frontend of claim 1, wherein, in the low frequency signal path, the passive network attenuates differential signal swings on the differential signal pair and the differential amplifier electrically isolates the common-mode voltage of the input differential signal pair from the active stage.

6. The receiver frontend of claim 5, wherein the differential amplifier has a gain, the gain to approximately offset the attenuation by the passive network.

7. An integrated circuit, comprising:
a first terminal for receiving a first signal of a first differential signal pair;
a second terminal for receiving a second signal of the first differential signal pair;
a DC blocking network coupled between the first differential signal pair and a second differential signal pair, the second differential signal pair coupled to an active receiver stage;
a baseline correction circuit coupled between the first differential signal pair and the second differential signal pair, the baseline correction circuit to pass, using a differential amplifier, differential voltages of the first differential signal pair and isolate a common-mode voltage of the first differential signal pair from the second differential signal pair;
a third terminal for coupling a first signal of the second differential signal pair to the active receiver stage; and,
a fourth terminal for coupling a second signal of the second differential signal pair to the active receiver stage, the DC blocking network comprising a first capacitor coupled between the first terminal and the third terminal, the DC blocking network also comprising a second capacitor coupled between the second terminal and the fourth terminal, the baseline correction circuit including an attenuating network to shift a common-mode voltage of the first differential signal pair by dividing the voltage of the first differential signal pair by a first factor to produce a third differential signal pair having a shifted common-mode voltage.

8. The integrated circuit of claim 7, wherein the differential amplifier receives the third differential signal pair and amplifies differential signals on the third differential signal pair by approximately the first factor.

9. The integrated circuit of claim 8, wherein a differential output of the differential amplifier is coupled to the second differential signal pair.

10. The integrated circuit of claim 7, wherein a high pass frequency response of the DC blocking network to differential signals on the first differential signal pair and a low pass frequency response to differential signals on the first differential signal pair of the baseline correction circuit combine to give a flat response.

11. The integrated circuit of claim 7, wherein a high pass passband of the DC blocking network to differential signals on the first differential signal pair and a low pass passband to differential signals on the first differential signal pair of the baseline correction circuit are different and combine to provide channel equalization.

12. A differential signal receiver, comprising:
a first terminal and a second terminal to receive a first differential signal pair;
a high-pass signal path to pass differential signals on the first differential signal pair to a second differential signal pair according to a high-pass filter response having a first cutoff frequency; and,
a low-pass signal path to pass the differential signals on the first differential signal pair to the second differential signal pair according to a low-pass filter response having a second cutoff frequency, the first differential signal pair to have a first common-mode voltage, the low-pass signal path to isolate the first common-mode voltage from the second differential signal pair using a differential amplifier that is a transconductance amplifier.

13. The differential signal receiver of claim 12, wherein the low-pass signal path includes a passive network to level shift the first common-mode voltage to a second common-mode voltage that is within a common-mode operating range of the transconductance amplifier that provides a selected differential signal amplification factor.

14. The differential signal receiver of claim 13 wherein selected differential signal amplification factor compensates for attenuation of the differential signals by the passive network.

15. The differential signal receiver of claim 13, wherein a first passband of the high-pass filter response and a second passband of the low-pass filter response have different magnitudes and the different magnitudes combine to provide a non-flat frequency response for channel equalization.

* * * * *